United States Patent [19]
Nezu

[11] Patent Number: 5,101,699
[45] Date of Patent: Apr. 7, 1992

[54] TOOL SLIDE FOR A MACHINE TOOL

[75] Inventor: Masahiro Nezu, Kamakura, Japan

[73] Assignee: Kabushiki Kaisha Shoun Kosakusho, Kamisucho, Toyonaka, Japan

[21] Appl. No.: 545,514

[22] Filed: Jun. 28, 1990

[51] Int. Cl.⁵ .............................................. B23B 29/00
[52] U.S. Cl. ......................................... 82/18; 82/137; 82/158
[58] Field of Search .................... 82/18, 137, 134, 904, 82/158, 144, 148, 160; 384/906, 42; 90/14

[56] References Cited

U.S. PATENT DOCUMENTS

| | | | |
|---|---|---|---|
| 155,425 | 9/1874 | Crandal | 82/147 X |
| 319,650 | 6/1885 | Whitney | 82/147 |
| 965,131 | 7/1910 | Buss | 82/147 X |
| 3,455,207 | 7/1969 | Meinke | 90/14 |
| 4,653,360 | 5/1987 | Compton | 82/18 |

Primary Examiner—Larry I. Schwartz
Assistant Examiner—Julie R. Daulton
Attorney, Agent, or Firm—Morrison Law Firm

[57] ABSTRACT

A light-weight, highly rigid tool slide for a machine tool is provided which may be machined with a high degree of precision, whereby lateral play or "wobble" of the tool is reduced. The tool slide comprises an elongated slide member slidingly carried in a substantially cylindrical channel formed in the surface of a base member. A cover member covers both the channel and the slide member, which has a flat surface machined therein so as to conform to the shape of the covered channel. The channel in the base member may include an enlarged middle portion to reduce surface contact with the slide member and to provide space for lubricating material. A through-bore may be formed in the slide member to reduce its weight. An encoder monitors the rotational angle of a workpiece and drives a numerical controller and servomotor to move a cutting tool inward and outward in synchronism with the rotation of the workpiece. The numberical controller can be programmed to attain any profile on the workpiece including circular, and non-circular.

4 Claims, 1 Drawing Sheet

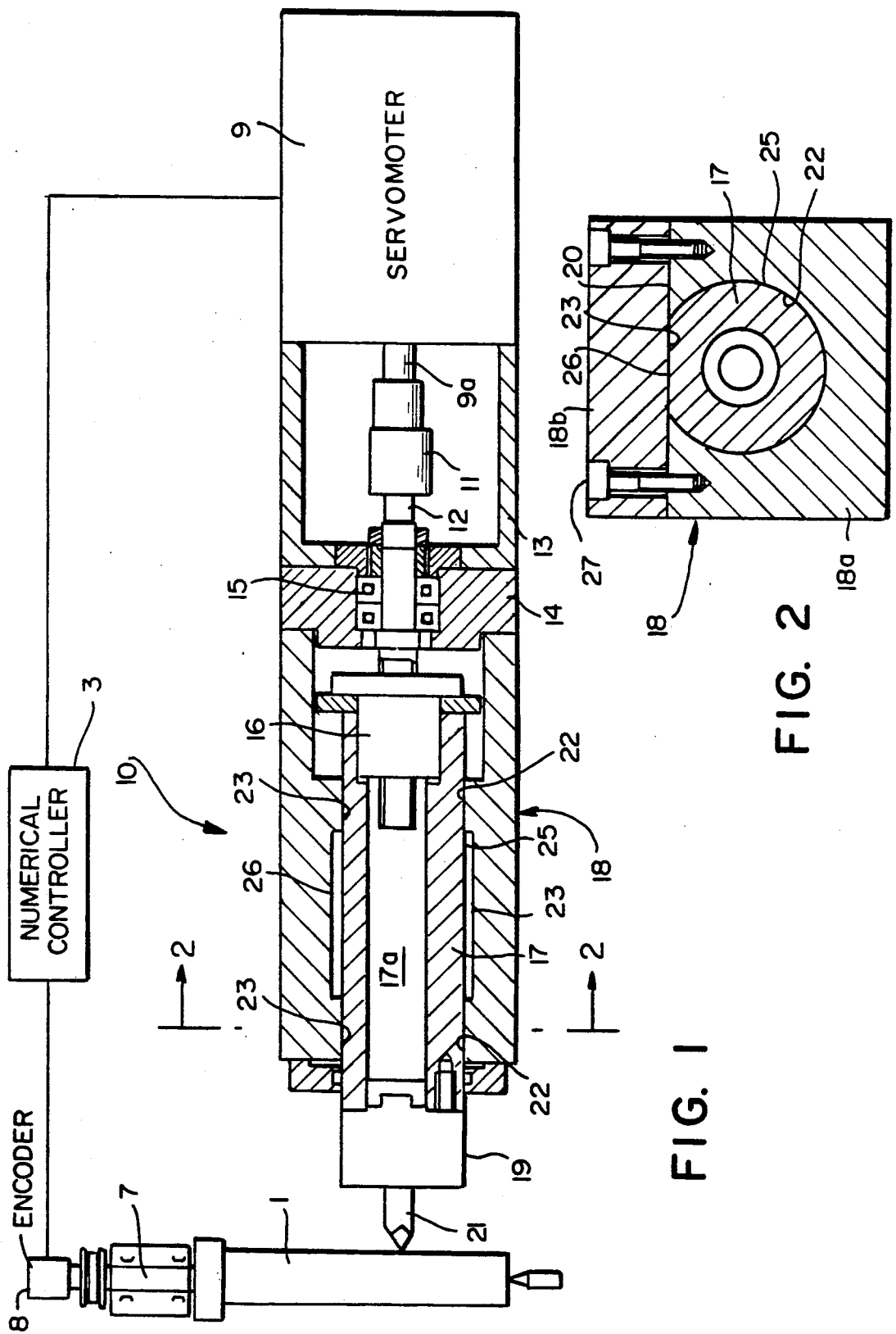

TOOL SLIDE FOR A MACHINE TOOL

BACKGROUND AND SUMMARY OF THE INVENTION

The present invention relates to machine tools and, more particularly, to an improved tool slide for accurately displacing a tool relative to a workpiece.

Conventional tool slides may consist of a tool-bearing slide member movably carried on a tool base by a dovetail joint or, as an alternative, the slide member may be carried in an open channel or groove formed in the tool base. Both of these approaches yield tool slides with great ridigity, but they are excessively heavy and, therefore. unsuited for high speed reciprocal movement. Furthermore, it is very difficult to precisely machine such tool slides and minor machining inaccuracies may result in unacceptable lateral play or "wobble" of the tool at the workpiece.

OBJECTS AND SUMMARY OF THE INVENTION

Accordingly, it is an object of the invention to provide a tool slide which is rigid, light in weight and which may be machined with a high degree of accuracy.

Briefly stated, the present invention provides a lightweight highly rigid tool slide for a machine tool which may be machined with a high degree of precision, whereby lateral play or "wobble" of the tool is reduced. The tool slide comprises an elongated slide member slidingly carried in a substantially cylindrical channel formed in the surface of a base member. A cover member covers both the channel and the slide member, which has a flat surface machined therein so as to conform to the shape of the covered channel. The channel in the base member may include an enlarged middle portion to reduce surface contact with the slide member and to provide space for lubricating material. A through-bore may be formed in the slide member to reduce its weight. An encoder monitors the rotational angle of a workpiece and drives a numerical controller and servomotor to move a cutting tool inward and outward in synchronism with the rotation of the workpiece. The numerical controller can be programmed to attain any profile on the workpiece including circular, and non-circular.

According to an embodiment of the invention, there is provided an improved tool slide for a machine tool, the tool slide comprising: a base having a planar upper surface and an open, cylindrical channel extending thereacross, the channel having a cross-section which is a portion of a circle, a cover having a planar lower surface fixed to the base in covering relation to the channel, with the cover lower surface opposing the base upper surface, and a slide member slidingly carried in the channel, the slide member having a cross-section which is a portion of a circle member corresponding to the cross-section of the channel, and, the slide including a planar surface in opposed relation to the lower cover.

According to a feature of the invention, there is provided a machine tool comprising: a base having a planar upper surface and an open, cylindrical channel extending thereacross, the channel having a cross-section which is a portion of a circle, a cover having a planar lower surface, fixed to the base in covering relation to the channel, with the cover lower surface opposing the base upper surface, and a slide member slidingly carried in the channel, the slide member having a cross-section which is a portion of a circle member corresponding to the cross-section of the channel, the slide including a planar surface in opposed relation to the lower cover, means for rotating a workpiece about an axis, means for measuring a rotational position of the workpiece, and means for controlling the slide member in response to the rotational position, whereby a non-circular profile may be given to the workpiece.

The above, and other objects, features and advantages of the present invention will become apparent from the following description read in conjunction with the accompanying drawings, in which like references numerals designate the same elements.

BRIEF DESCRIPTION OF THE DRAWINGS

FIG. 1 is a diagram of a machine tool, partly simplified, incorporating an embodiment of the present invention.

FIG. 2 is a cross-sectional view taken along line A—A of FIG. 1.

DETAILED DESCRIPTION OF THE PREFERRED EMBODIMENT

Referring now to FIG. 1, there is shown, generally at 10, an embodiment of the present invention in association with a numerically controlled machine tool, functionally illustrated.

A workpiece 1 is mounted on a rotatably driven main spindle 7. The rotational position of workpiece 1 is detected by an encoder 8 which controls a servomotor 9 through a numerical controller 3.

A ball screw 12 is connected to the output shaft 9a of servomotor 9 through a joint 11 supported by bearings 15 which are mounted on an intermediate plate 14. Intermediate plate 14 is fixed to a housing 13 to which servomotor 9 is also attached. Ball screw 12 is provided with a nut 16 fixed to a slide member 17 which is slideably carried in a tool slide housing 18 fixed to intermediate plate 14.

It will be appreciated that, when servomotor 9 is actuated, ball screw 12 is rotated, thereby displacing slide member 17 within tool slide housing 18. This causes rotating workpiece 1 to be machined by a cutting tool 21 fixed in a tool post 19 which is disposed on the distal end of slide member 17.

As best seen in FIG. 2, tool slide housing 18 comprises a base 18a and a cover 18b. Base 18a includes a planar upper surface 20, and an open, cylindrical channel 22 communicating therewith. The cross-section of channel 22 is a portion of a circle. Cover 18b, which is fastened to base 18a by bolts 27, in covering relation to channel 22, includes a planar lower surface 23. Slide member 17, slidingly carried in channel 22, has a planar upper surface 26 in opposed relation to lower surface 23 on cover 18b. The cross-section of slide member 17 is a portion of a circle corresponding the cross-section of channel 22. Both member 17 and tool slide housing 18 are polished to reduce friction and promote smooth, precisely controllable movement.

As shown in FIG. 1, channel 22 may advantageously include an enlarged area 28, intermediate its ends, which serves to reduce the surface contact between slide member 17 and housing base 18a, and also to provide a partly annular space therebetween adapted to receive a lubricating material. Likewise, an axially extending through-bore 17a may be formed in slide member 17, thereby reducing the weight thereof and increasing the responsiveness of the tool slide.

Encoder 8 provides information regarding the rotational position of workpiece 1. Numerical controller 3 may be programmed to provide control signals to servomotor 9 which machines workpiece 1 in a profile that is different from a circular cross section. For example, numerical controller 3 may produce control signals which cause cutting tool 21 to move cyclically in and out in a fashion that machines workpiece 1 into an elliptical profile. Alternatively, the control of cutting tool 21 may machine workpiece 1 into a heart-shaped or other selected profile. The exact profile is not considered to be part of the invention. Instead, the ability to control the inward and outward motion of cutting tool 1 cyclically in synchronism with the rotation of workpiece 1, whereby a non-circular profile may be given to workpiece 1, is an element of one embodiment of the present invention.

Encoder 8 may be of any conventional type. In the preferred embodiment, encoder 8 is a digital encoder that is mounted coaxial with workpiece 1 to respond directly to motion of workpiece 1 with a digital code indicative of the rotational position thereof. Numerical controller 3 may also be of any conventional type but, in the preferred embodiment, numerical controller 3 is a digital computer and, most preferably, is a programmed digital microprocessor. Servomotor 9 is a conventional device of any type that is well known to those skilled in the art, and thus further description thereof is considered to be unnecessary.

Having described the preferred embodiment of the invention with reference to the accompanying drawings, it is to be understood that the invention is not limited to this precise embodiment, and that various changes and modifications may be effected therein by one skilled in the art without departing from the scope or spirit of the invention as defined in the appended claims.

What is claimed is:

1. An improved tool slide for a machine tool, said tool slide consisting of a base having a planar upper surface and an open, cylindrical channel extending thereacross, said channel having a cross-section which is a portion of a circle;

a cover having a planar lower surface, fixed to said base in covering relation to said channel, with said cover lower surface opposing said base upper surface; and a slide member slidingly carried in said channel:;

said slide member having a cross-section which is a portion of a circle member corresponding to the cross-section of said channel;

and said slide including a planar surface in opposed relation to said cover lower surface.

2. The improved tool slide of claim 1 wherein; said base includes an enlarged area in said channel intermediate its ends;

said enlarged area being effective in reducing surface contact between said slide member and said base and providing a partly annular space therebetween adapted to receive a lubricating material.

3. The improved tool slide of claim 1, wherein an axially extending through-bore is formed in said slide member, thereby reducing the weight thereof and increasing the responsiveness of the tool side.

4. A machine tool consisting of a base having a planar upper surface and an open, cylindrical channel extending thereacross, said channel having a cross-section which is a portion of a circle;

a cover having a planar lower surface, fixed to said base in covering relation to said channel, with said cover lower surface opposing said base upper surface; and a slide member slidingly carried in said channel;

said slide member having a cross-section which is a portion of a circle member corresponding to the cross-section of said channel;

said slide including a planar surface in opposed relation to said cover lower surface, means for rotating a workpiece about an axis;

means for measuring a rotational position of said workpiece; and means for controlling said slide member in response to said rotational position, whereby a non-circular profile may be given to said workpiece.

* * * * *